United States Patent [19]

Vanhoof et al.

[11] 3,923,815
[45] Dec. 2, 1975

[54] DERIVATIVES OF 2-AMINOINDANE THEREOF
[75] Inventors: Pierre Marie Vanhoof; Pierre M. Clarebout, both of Brussels, Belgium
[73] Assignee: A. Christiaens Societe Anonyme, Brussels, Belgium
[22] Filed: Nov. 6, 1973
[21] Appl. No.: 413,304

[30] Foreign Application Priority Data
Nov. 6, 1972 United Kingdom............... 51094/72

[52] U.S. Cl. 260/293.62; 260/326.33; 260/326.5 L; 260/326.85; 260/561 A; 260/570.5 P; 424/267; 424/274; 424/320; 424/330
[51] Int. Cl.²......................................... C07D 295/14
[58] Field of Search... 260/293.62, 326.33, 326.5 L, 260/326.85, 561 A, 570.5 P

[56] References Cited
UNITED STATES PATENTS
3,442,893  5/1969  Lynch................................ 260/240

OTHER PUBLICATIONS
Lahiri et al., J. Pharm. Sci. 57, 1013–6, (1968).

*Primary Examiner*—G. Thomas Todd
*Attorney, Agent, or Firm*—Sughrue, Rothwell, Mion, Zinn & Macpeak

[57] ABSTRACT

This invention relates to new derivatives of 2-aminoindane, namely 1-(alkoxy or $R_3$, $R_4$-amino)-2-[N-phenyl-($R_1$,$R_2$-aminoalkyl of alkanoyl)]-aminoindanes, in which $R_1$ and $R_2$ represent a lower alkyl or hydroxyalkyl group, or form together with the attached nitrogen atom a nitrogenous heterocyclic ring, with the proviso that $R_1$ may also represent hydrogen, $R_3$ and $R_4$ have the same meanings as $R_1$ and $R_2$ except hydroxyalkyl, as well as the acid addition salts of these new derivatives.

These compounds have interesting antiarrhytmic properties.

13 Claims, No Drawings

DERIVATIVES OF 2-AMINOINDANE THEREOF

BRIEF DESCRIPTION OF THE INVENTION

This invention relates to new derivatives of 2-aminoindane, the preparation and use thereof.

The new derivatives of 2-aminoindane according to this invention are the compounds of formula:

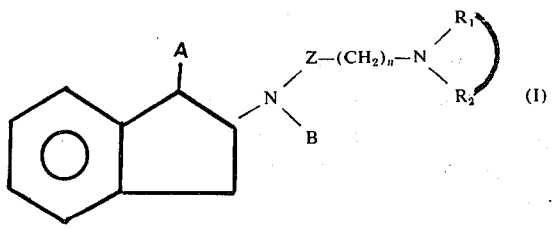

in which $n$ is equal to 1, 2, 3, Z represents a $CH_2$ or a CO group, $R_1$ and $R_2$ represent each a lower alkyl or hydroxyalkyl group containing 1 to 3 carbon atoms, $R_1$ may also represent hydrogen, and $R_1$ and $R_2$ may also form with the attached nitrogen atom a nitrogenous heterocyclic ring, B represents an unsubstituted phenyl group, A represents a methoxy or ethoxy group or a group of the formula

wherein $R_3$ and $R_4$ each represent a methyl or ethyl group or may form with the attached nitrogen atom a nitrogenous heterocyclic ring, as well as the acid addition salts of said compounds of formula I. The nitrogenous heterocyclic ring or rings of the new derivatives of formula I may be selected among piperidino, pyrrolidino and morpholino rings.

The preferred compounds of the formula I are those in which $R_1$ and $R_2$ represent a methyl or ethyl group, those in which $R_1$ also represents a hydrogen atom and those wherein $R_1$ and $R_2$ form together with the attached nitrogen atom a piperidino or pyrrolidino group, as well as the acid addition salts thereof such as the hydrochlorides, fumarates, oxalates, etc.

This invention relates also to pharmaceutical compositions containing, as active ingredient, at least one compound of general formula I, together with a pharmaceutically acceptable carrier.

Finally, the invention relates to processes for preparing the new compounds of formula I.

DETAILED DESCRIPTION OF THE INVENTION

Examples of preferred compounds of formula I are as follows:

1-methoxy-2-[N-phenyl-N-(diethylaminopropyl)]-aminoindane (formula I: $R_1 = R_2 = C_2H_5$; $n = 2$; $A = OCH_3$; $B =$ phenyl; $Z = CH_2$).

1-methoxy-2-[N-phenyl-N-(diethylaminopropionyl)]-aminoindane (formula I: $R_1 = R_2 = C_2H_5$; $n = 2$; $A = OCH_3$; $B =$ phenyl; $Z = CO$).

1-ethoxy-2-[N-phenyl-N-(diethylaminopropyl)]-aminoindane (formula I: $R_1 = R_2 = C_2H_5$; $n = 2$; $A = OC_2H_5$; $B =$ phenyl; $Z = CH_2$).

1-methoxy-2-[N-phenyl-N-(dimethylaminopropyl)]-aminoindane (formula I: $R_1 = R_2 = CH_3$; $n = 2$; $A = OCH_3$; $B =$ phenyl; $Z = CH_2$).

1-methoxy-2-[N-phenyl-N-diethylaminoacetyl]-aminoindane (formula I: $R_1 = R_2 = C_2H_5$; $n = 1$; $A = OCH_3$; $B =$ phenyl; $Z = CO$).

1-methoxy-2-[N-phenyl-N-(diethylaminoethyl)]-aminoindane (formula I: $R_1 = R_2 = C_2H_5$; $n = 1$; $A = OCH_3$; $B =$ phenyl; $Z = CH_2$).

1-methoxy-2-(N-phenyl-N-piperidinoacetyl)-aminoindane (formula I: $A = OCH_3$; $B =$ phenyl;

$=$ piperidino; $n = 1$; $Z = CO$).

1-methoxy-2-[N-phenyl-N-(piperidinoethyl)]-aminoindane (formula I:

$=$ piperidino; $n = 1$; $A = OCH_3$; $B =$ phenyl; $Z = CH_2$).

1-dimethylamino-2-[N-phenyl-N-(γ-diethylaminopropyl)]-aminoindane (formula I: $R_1 = R_2 = C_2H_5$; $n = 2$; $A =$ dimethylamino; $B =$ phenyl; $Z$ 32 $CH_2$).

1-dimethylamino-2-[N-phenyl-N-(γ-dimethylaminopropyl)]-aminoindane (formula I: $R_1 = R_2 = CH_3$; $n = 2$; $A =$ dimethylamino; $B =$ phenyl; $Z = CH_2$).

1-diethylamino-2-[N-phenyl-N-(γ-diethylaminopropyl)]-aminoindane (formula I: $R_1 = R_2 = C_2H_5$; $n = 2$; $A =$ diethylamino; $B =$ phenyl; $Z = CH_2$).

1-diethylamino-2-[N-phenyl-N-(β-dimethylaminoethyl)]-aminoindane (formula I: $R_1 = R_2 = CH_3$; $n = 1$; $A =$ diethylamino; $B =$ phenyl; $Z = CH_2$).

1-methoxy-2-[N-phenyl-N-(diethylaminoethyl)]-aminoindane (formula I: $R_1 = R_2 = C_2H_5$; $n = 1$; $A = OCH_3$; $B =$ phenyl; $Z = CH_2$).

1-ethoxy-2-[N-phenyl-N-(diethylaminoacetyl)]-aminoindane (formula I: $R_1 = R_2 = C_2H_5$; $n = 1$; $A = OC_2H_5$; $B =$ phenyl; $Z = CO$).

1-ethoxy-2-[N-phenyl-N-(diethylaminoethyl)]-aminoindane (formula I: $R_1 = R_2 = C_2H_5$; $n = 1$ $A = OC_2H_5$; $B =$ phenyl; $Z = CH_2$).

1-ethoxy-2-[N-phenyl-N-($\beta$-diethylaminopropionyl)]-aminoindane (formula I: $R_1 = R_2 = C_2H_5$; $n = 2$; $A = OC_2H_5$; $B =$ phenyl; $Z = CO$).

1-ethoxy-2-[N-phenyl-N-($\gamma$-diethylaminopropyl)]-aminoindane (formula I: $R_1 = R_2 = C_2H_5$; $n = 2$; $A = OC_2H_5$; $B =$ phenyl; $Z = CH_2$).

1-methoxy-2-[N-phenyl-N-(piperidinopropionyl)]-aminoindane hydrochloride (formula I: $B =$ phenyl;

$=$ piperidino; $n = 2$; $A = OCH_3$; $Z = CO$).

1-methoxy-2-[N-phenyl-N-(piperidinopropyl)]-aminoindane hydrochloride (formula I: $B =$ phenyl;

$=$ piperidino; $n = 2$; $A = OCH_3$; $Z = CH_2$).

1-methoxy-2-[N-phenyl-N-$\beta$-(4'-methylpiperazino)-propionyl]-aminoindane (formula I: $A = OCH_3$; $B =$ phenyl; $n = 2$;

$=$ methylpiperazino; $Z = CO$).

1-methoxy-2-[N-phenyl-N-($\gamma$-methylpiperazinopropyl)]-aminoindane trihydrochloride (formula I: $B =$ phenyl; $A = OCH_3$; $n = 2$;

$=$ methylpiperazino; $Z = CH_2$).

1-ethoxy-2-[N-phenyl-N-($\beta$-pyrrolidinopropionyl)]-aminoindane hydrochloride (formula I: $A = OC_2H_5$;

$=$ pyrrolidino; $n = 2$; $B =$ phenyl; $Z = CO$).

1-ethoxy-2-[N-phenyl-N-(pyrrolidinopropyl)]-aminoindane hydrochloride (formula I: $A = OC_2H_5$;

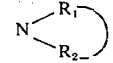

$=$ pyrrolidino; $n = 2$; $B =$ phenyl; $Z = CH_2$).

1-methoxy-2-[N-phenyl-N-($\beta$-methylaminopropionyl)]-aminoindane hydrochloride (formula I: $A = OCH_3$; $R_1 = H$; $R_2 = CH_3$; $B =$ phenyl; $n = 2$; $Z = CO$).

1-methoxy-2-[N-phenyl-N-(methylaminopropyl)]-aminoindane (formula I: $A = OCH_3$; $R_1 = H$; $R_2 = CH_3$; $B =$ phenyl; $n = 2$; $Z = CH_2$).

1-methoxy-2-[N-phenyl-N-($\beta$-ethylaminopropionyl)]-aminoindane hydrochloride (formula I: $A = OCH_3$; $R_1 = H$; $R_2 = C_2H_5$; $B =$ phenyl; $n = 2$; $Z = CO$).

1-methoxy-2-[N-phenyl-N-($\beta$-ethylaminopropyl)]-aminoindane hydrochloride (formula I: $A = OCH_3$; $R_1 = H$; $R_2 = C_2H_5$; $B =$ phenyl; $n = 2$; $Z = CH_2$).

1-ethoxy-2-[N-phenyl-N-($\beta$-ethylaminopropionyl)]-aminoindane hydrochloride (formula I: $A = OC_2H_5$; $R_1 = H$; $R_2 = C_2H_5$; $B =$ phenyl; $n = 2$; $Z = CO$).

1-ethoxy-2-[N-phenyl-N-($\gamma$-ethylaminopropyl)]-aminoindane hydrochloride (formula I: $A = OC_2H_5$; $R_1 = H$; $R_2 = C_2H_5$; $B =$ phenyl; $n = 2$; $Z = CH_2$).

1-ethoxy-2-[N-phenyl-N-(ethylaminoacetyl)]-aminoindane fumarate (formula I: $A = OC_2H_5$; $R_1 = H$; $R_2 = C_2H_5$; $B =$ phenyl; $n = 1$; $Z = CO$).

1-ethoxy-2-[N-phenyl-N-($\beta$-ethylaminoethyl)]-aminoindane hydrochloride (formula I: $A = OC_2H_5$; $R_1 = H$; $R_2 = C_2H_5$; $B =$ phenyl; $n = 1$; $Z = CH_2$).

1-methoxy-2-[N-phenyl-N-($\gamma$-methylethylaminopropyl)]-aminoindane hydrochloride (formula I: $A = OCH_3$; $R_1 = CH_3$; $R_2 = C_2H_5$; $n = 2$; $Z = CH_2$; $B =$ phenyl).

1-methoxy-2-[N-phenyl-N-($\beta$-morpholinopropionyl)]-aminoindane hydrochloride (formula I: $A = OCH_3$; $B =$ phenyl; $n = 2$;

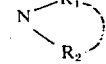

$=$ morpholino; $Z = CO$).

1-methoxy-2-[N-phenyl-N-(β-pyrrolidinopropionyl)]-aminoindane hydrochloride (formula I: A = OCH₃; B = phenyl; n = 2;

= pyrrolidino; Z = CO).

1-ethoxy-2-[N-phenyl-N-(β-piperidinopropionyl)]-aminoindane hydrochloride (formula I: A = OC₂H₅ ; B = phenyl: n = 2 ;

= piperidino; Z = CO).

1-methoxy-2-[N-phenyl-N-(γ-piperidinobutyroyl)]-aminoindane hydrochloride (formula I: A = OCH₃ ; B = phenyl ; n = 3;

= piperidino; Z = CO).

1-diethylamino-2-[N-phenyl-N-(β-piperidinopropionyl)]-aminoindane oxalate (formula I:

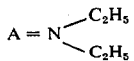

B = phenyl;

= piperidino; n = 2; Z = CO).

It has been surprisingly found that the compounds of the general formula I where Z represents a CO or a CH₂ group are very active for the treatment of heart arrhythmia.

Said compounds can be used for the treatment of various heart diseases such as premature heart contractions, ventricular and supraventricular tachycardias either idiopathic or subsequent to a cardiopathia or to a coronary disease, cardiac arrhythmias due to digitalin intoxication, as well as atrial fibrillation and flutter, particularly in the early stage.

It is known (see Koch-Weser, J. Arch. Int. Med. 129; 763, 1972) that none of the presently available antiarrhythmic agents are satisfactory for the prophylaxis of tachycardias and fibrillation of ventricular origin.

The oral activity of the known antiarrhythmic agents, such as procainamide or lidocaine, is either too short leading to multiple day and night administration (for example with procainamide) or too low to be of some practical utility (for example with lidocaine) or their therapeutic activity is conjugated with frequent and dangerous side effects, such as hypotension (with procainamide), sudden death, agranulocytosis or idiosyncrasy.

The compounds of general formula I according to this invention are very active when orally administered, although they may also be administered parenterally. They have also a long activity duration and are not depressant for the myocardial function.

Applicants do not know any orally active antiarrhythmic agent which does not act at the same time as a depressant of the myocardial function.

The oral antiarrhythmic activity of the compounds of formula I has been proved by tests on rats using aconitine which is a compound causing premature heart contractions and death of the animals.

The method used for these tests is described hereafter:

Animals:

Male or female rats with a body-weight ranging from 380 to 450 g.

Aconitine solution:

3.12 μg aconitine nitrate/1 ml physiological saline.

Solution of the compound to be tested:

0.75% in distilled water.

Method:

Six random selected animals are required for each compound to be tested. The compound is administered by oral route at the dose of 75 mg/kg (1 ml of the 0.75% solution/100 g of body-weight) 75 minutes before the intravenous perfusion of the aconitine solution is initiated. Control groups of animals are treated only with distilled water (1 ml/100 g).

60 minutes after the administration of the compound to be tested, the animals are anesthesized by an intraperitoneal injection of Pentobarbital (50 mg/kg) and the jugular vein is dissected.

A catheter is introduced in the vein and fixed by a ligature.

The ECG (D II derivation) is then continuously recorded. The perfusion of the aconitine solution is started 75 minutes after the administration of the compound to be tested.

The volume delivered by the injection device being 0.287 ml/minute, the dose of aconitine nitrate administered is 0.895 μg/minute (0.20–0.24 μg/100 g/minute according to the minimal and maximal weight of the animals).

The experience is stopped as soon as the first extrasystoles are appearing and the time elapsed from the beginning of the perfusion is noted.

The results are expressed as the mean total dose of aconitine injected in a group of animals.

The relative activity between a tested compound and a reference substance (lidocaine, procainamide) is computed in the following way:

$$A(x) = \frac{\overline{X} - \overline{C}}{\overline{R} - \overline{C}} \times 100$$

where $A(x)$ = activity of tested compound X (in %)

$\overline{X}$ = mean dose of aconitine in the animals treated by compound X $\overline{C}$ = mean dose of aconitine injected in the untreated animals (controls)

$\bar{R}$ = mean dose of aconitine injected in the animals treated by the reference substances.

The following table gives the results of the evaluation of the antiarrhythmic activity by oral route of a great number of acid addition salts of compounds of formula I, compared to the acitivity of two well known antiarrhythmic agents (procainamide and lidocaine).

TABLE 1

| Compound of Ex. | A | Z | n | $N\begin{array}{c}R_1\\R_2\end{array}$ | Activity % compared with | |
|---|---|---|---|---|---|---|
| | | | | | Lidocaine | Procainamide |
| 5 | —OCH₃ | CH₂ | 1 | diethylamino | 708 % | 904 % |
| 9 | | | | piperidino | 334 | 426 |
| 27 | | | 2 | monomethylamino | 836 | 1067 |
| 29 | | | | monoethylamino | 880 | 1124 |
| 3 | | | | dimethylamino | 755 | 963 |
| 1 | | | | diethylamino | 981 | 1251 |
| 34 | | | | methyl-ethylamino | 1356 | 1730 |
| 21 | | | | piperidino | 1058 | 1350 |
| 23 | | | | methylpiperazino | 420 | 536 |
| 4 | | CO | 1 | diethylamino | 1116 | 1426 |
| 8 | | | | piperidino | 568 | 726 |
| 28 | | | 2 | monoethylamino | 925 | 1180 |
| 6 | | | | diethylamino | 1256 | 1652 |
| 20 | | | | piperidino | 1578 | 2013 |
| 35 | | | | morpholino | 241 | 308 |
| 38 | | | 3 | piperidino | 832 | 1062 |
| 17 | —OC₂H₅ | CH₂ | 1 | diethylamino | 390 | 497 |
| 31 | | | 2 | monoethylamino | 599 | 765 |
| 2 | | | | diethylamino | 919 | 1173 |
| 25 | —OC₂H₅ | CH₂ | 2 | pyrrolidino | 800 % | 1020 % |
| 10 | —N(CH₃)(CH₃) | CH₂ | 2 | diethylamino | 146 | 186 |
| 12 | —N(C₂H₅)(C₂H₅) | CH₂ | 2 | diethylamino | 416 | 531 |

The compounds of the formula I may be administered orally or parenterally.

Oral preparations may be administered under the form of capsules, tablets, pills and the like. Each capsule, tablet or pill may contain from 10 to 200 mg of a compound of formula I as active ingredient, together with pharmaceutically acceptable excipients or carriers.

Parenteral preparations may consist in a solution for perfusion or for intravenous or intramuscular injection. Such a solution may contain from 0.2 per thousand to 2 per thousand of a compound of formula I.

The parenteral preparation may be either a solution which may be directly used for the perfusion and contains a proportion of the active ingredient within the above limits, or a concentrated solution containing 1 to 10% of the active ingredient, said concentrated solution being diluted when administered to a patient.

The initial dose of active ingredient may be of 200 to 800 mg per day during 2 or 3 days, the maintenance dose being of about 25 mg to 300 mg per day.

If a single dose is sufficient for obtaining the therapeutic effect, this dose is generally comprised between 50 and 300 mg.

The active ingredient may be administered at the same time by the parenteral route (for example by perfusion) and by the oral route.

This invention relates also to processes for preparing the new compounds of formula I.

According to this invention, the compounds of formula I may be prepared from a compound of the following formula:

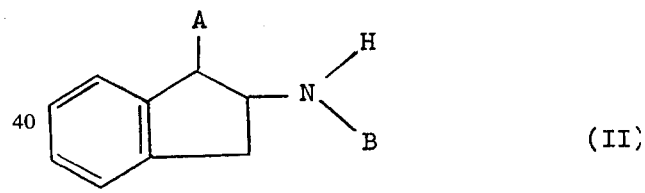
(II)

in which A and B have the above meanings, by the three following processes:

First process:

This process involves the preparation of a sodium salt of a compound of formula II by means of sodium amide and the reaction of the obtained sodium salt with a halogenated amine of the formula:

$$\text{Hal}-(CH_2)_{n+1}-N\begin{array}{c}R_1\\R_2\end{array} \qquad (III)$$

in which Hal represents a halogen atom, preferably a chlorine atom, whereas n, R₁ and R₂ have the above meanings.

Second process:

This process involves the acylation of a compound of formula II with an acid chloride of the formula:

Cl (CH₂)ₙ COCl          (IV)

in which n = 1, 2 or 3, so as to obtain an acylated compound of the formula:

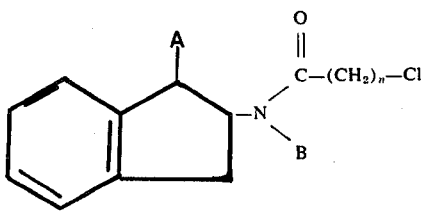

(V)

the subsequent reduction of the acylated compound of formula V by means of aluminum lithium hydride into a compound of the following formula:

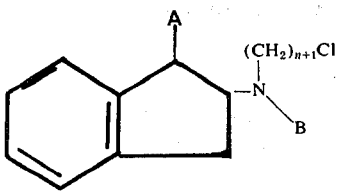

(VI)

in which n, A and B have the above meanings, the obtained compound of formula VI being finally alkylated by means of a primary or secundary amine of the formula:

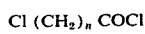

(VII)

in which $R_1$ and $R_2$ have the above meanings.

Third process:

This process involves the acylation of a compound of formula II with an acid chloride of the formula:

Cl (CH$_2$)$_n$ COCl    (IV)

in which n = 1, 2 or 3, so as to obtain an acylated compound of the formula:

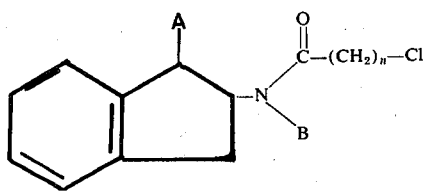

(V)

the subsequent N-alkylation of the acylated compound of formula V with a primary or secundary amine of the formula:

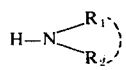

(VII)

in which $R_1$ and $R_2$ have the above meanings, so as to obtain a compound of the formula:

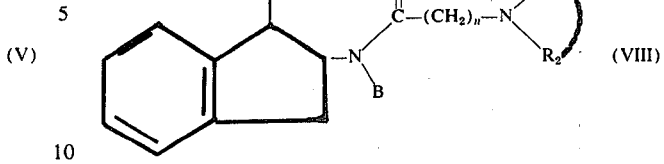

(VIII)

which is a compound of formula I wherein Z represents a CO group. The latter compound can be finally reduced into a compound of formula I wherein Z represents $CH_2$, by means of aluminum lithium hydride.

The compounds of formula II used as starting materials in the three preceding processes according to this invention may be prepared by reacting a compound of the following formula:

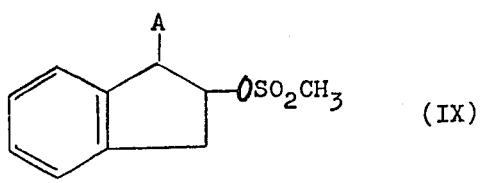

(IX)

or a compound of the following formula:

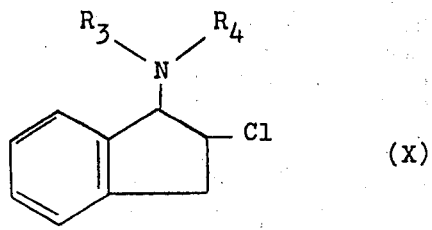

(X)

with aniline.

The compounds of formula IX may be prepared from compounds of the following formula:

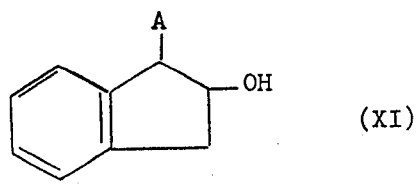

(XI)

by reaction of the latter compounds with the chloride of methane sulfonic acid.

The compounds of the formula X may be prepared by reacting compounds of the following formula:

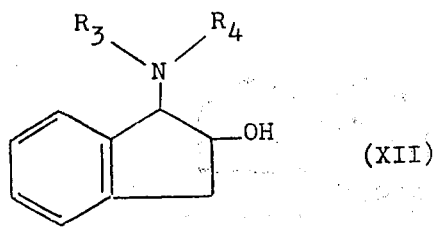

(XII)

in which R₃ and R₄ have the above meanings, with thionyl chloride.

The compounds of formula XI and XII may be obtained from 2-bromo-indanol-1 of formula:

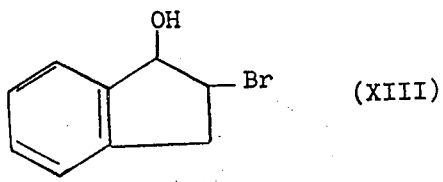

(XIII)

said 2-bromo-indanol-1 being obtained from indene by the method described by W. Treibs and Schroth; Ann. 639, 204 (1961).

When 2-bromo-indanol-1 of the formula XIII is treated by means of an alcohol, such as methanol or ethanol, in the presence of an alcoholate, an 1-alkoxy-indanol-2 of formula XI is obtained. This reaction may be effected by the method described by W. Treibs and Schroth; Ann. 639, 204 (1961).

When 2-bromo-indanol-1 of the formula XIII is treated by means of an amine of the formula XII, a compound of the formula XII is obtained. The method used for this reaction is as described by J. Sam, Th. C. Snapp, Jr. in Journal of Pharmaceutical Sciences P. 1364 (1964) or by N. Levin, B. E. Graham, H. G. Kolloff in J.O.C. 9, 380 (1944).

Fourth process:

This process involves the N-alkylation of a N-substituted aniline monohydrochloride of the formula:

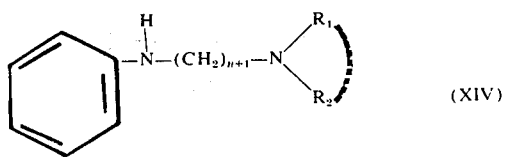

(XIV)

in which $n$, $R_1$ and $R_2$ have the above meanings, by means of a 2-indanol mesylate of the formula:

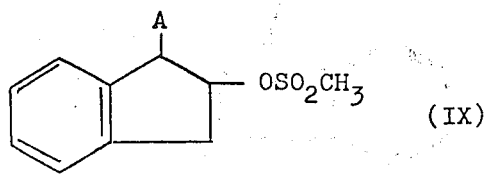

(IX)

Fifth process:

This process involves the reaction of a compound of the formula II with a bromo-chloro-alkane of the formula:

$$Br - (CH_2)_{n+1} - Cl \qquad (XV)$$

in which $n$ has the above meanings, so as to obtain an intermediate compound of the formula:

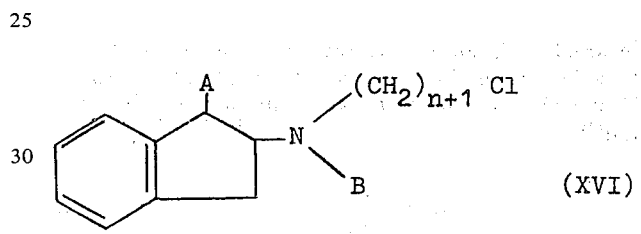

(XVI)

which is then reacted, possibly without isolation, with an amine of the formula VII.

The following examples 1 to 39 illustrate the preparation of the new compounds of formula I.

EXAMPLE 1

Preparation of 1-methoxy-2-[N-(diethylaminopropyl)]-aminoindane (formula I: $R_1 = R_2 = C_2H_5$; $n = 2$; $A = OCH_3$; $B =$ phenyl; $Z = CH_2$).

1. Preparation of mesylate of 1-methoxy-2-hydroxyindane (formula IX: $A = OCH_3$).

82 grams (0.5 mol) of 1-methoxy-2-hydroxyindane (formula IX, $A = OCH_3$) are dissolved in 250 ml of pyridine. The solution is cooled at 0°C and 45 ml (0.55 mol) of choloride of methane sulfonic acid are added drop by drop to said solution, while maintaining the temperature between 0° and 5°C. The reaction mixture is then stirred during 1 hour at room temperature and subsequently poured onto ice. After filtration and drying, 113 grams of the desired mesylate melting at 55°–75°C are obtained. The product is recrystallized from petroleum ether.

Yield: 91 %.

Analysis: % calculated: C 54.54; H 5.82. % found: C 54.67; H 5.82.

2. Preparation of 1-methoxy-2-phenylaminoindane (formula II: A = OCH$_3$; B = phenyl).

60.5 grams of the mesylate obtained in section 1 and 125 ml of aniline are heated during 3 hours at 150°C. The reaction mixture is then cooled and extracted by means of 150 ml of ether. After separation of the precipitated aniline mesylate by filtration, the ether is removed from the filtrate and the filtrate is distilled. The desired product distils at 165°C/0.05 mm. The distilled product becomes solid and is recrystallized from isopropanol. Melting point: 53°–54°C.

Analysis of the hydrochloride melting at 182°–184°C and recrystallized from acetone. % calculated: C 69.68; H 6.58; N 5.07; Cl 12.85. % found: C 69.65; H 6.55; N 5.18; Cl 12.68.

3. Preparation of 1-methoxy-2-[N-phenyl-N-(diiethylaminopropyl)]-aminoindane (formula I: R$_1$ = R$_2$ = C$_2$H$_5$; n = 2 ; A = OCH$_3$; B = phenyl; Z = CH$_2$).

A mixture of 1.2 grams (0.03 mol) of NaNH$_2$, 30 ml of toluene and 0.015 mol of 1-methoxy-2-phenylamino-indane is boiled during 30 minutes. 3.75 grams of γ-chloropropyldiethylamine are then added and the mixture is refluxed during 3 hours. After cooling and addition of 50 ml of water, the toluene phase is separated, dried and concentrated, so as to obtain a residue (6.3 grams) which is treated with 2 grams of fumaric acid and 50 ml of water. The obtained solution is evaporated under vacuum and the residue is treated by means of 50 ml. of ether. A solid product is obtained. After recrystallization from acetone or a mixture of acetone and methanol, 4.4 grams of a product melting at 138°–140°C are obtained.

Yield: 63%.

Analysis: % calculated: C 69.2; H 7.74; N 5.97. % found: CC ; H 7.38; N 6.12.

Another method for preparing the desired compound is described in Example 7.

EXAMPLE 2

Preparation of 1-ethoxy-2-[N-phenyl-N-(diethylaminopropyl)]-aminoindane (formula I: R$_1$ = R$_2$ = C$_2$H$_5$; n = 2; A = OC$_2$H$_5$ B = phenyl; Z = CH$_2$).

1. Preparation of 1-ethoxy-2-hydroxyindane (formula XI: A = OC$_2$H$_5$).

5 grams of Na are dissolved in 140 ml of ethanol. To the obtained solution, 42.3 grams of 1-hydroxy-2-bromoindane are added. The mixture is refluxed during 19 hours under nitrogen. 100 ml of ethanol are removed by distillation and 200 ml of ether are added. After cooling, the sodium bromide is separated by filtration and the ether is evaporated. The desired product is obtained by distillation at 87°–90°C/0.05 mm. Yield: 25.4 grams (71%).

2) Preparation of the mesylate of 1-ethoxy-2-hydroxy indane (formula IX: A = OC$_2$H$_5$).

0.07 mol of 1-ethoxy-2-hydroxyindane and 0.105 mol (10.6 grams) of distilled triethylamine are dissolved in 60 ml of anhydrous dichloromethane. 0.077 mole (8.82 grams) of CH$_3$SO$_2$Cl are then added drop by drop to the solution which has previously been cooled to −5°C. The mixture is then stirred during 30 minutes at room temperature. The reaction mixture is diluted with 60 ml of dichloromethane and the obtained solution is successively washed with 10% hydrochloric acid (100 ml at 0°C), with a saturated solution of sodium bicarbonate (30 ml at 0°C) and with a saturated aqueous solution of sodium chloride (50 ml at 0°C). The organic phase is then dried and evaporated. 16.17 grams (94%) of a residue melting at 56°–57°C after recrystallization from isopropanol are obtained.

Analysis: % calculated: C 56.23; H 6.29; S 12.51. % found: C 56.6; H 6.27; S 12.42.

3. Preparation of 1-ethoxy-2-phenylaminoindane (formula II: A = OC$_2$H$_5$; B = phenyl).

60.5 grams of the mesylate obtained in section 2 of Example 2 and 125 ml of aniline are heated during 45 minutes at 150°C. After cooling, the mixture is treated with 150 ml of ether and the formed aniline mesylate is separated by filtration. The ether is removed from the filtrate and the excess of aniline is distilled. The residue of this distillation is treated with 6-N-hydrochloric acid, so as to obtain the hydrochloride which is extracted by means of chloroform. The obtained solution is dried on sodium sulfate, filtered and concentrated to dryness. By addition of acetone, 19.77 grams (yield = 56%) of the hydrochloride melting at 172°–173°C are obtained. After recrystallization from a mixture of acetone and methanol, the hydrochloride melts at 176°C.

Analysis of the hydrochloride: % calculated: C 70.45; H 6.96; N 4.83; Cl 12.24. % found: C 70.85; H 6.88; N 5.0; Cl 12.1.

The free base melts at 71°–72°C and is recrystallized from isopropanol.

Analysis of the base: % calculated: C 80.59; H 7.56; N5.53. % found: C 80.35; H 7.42; N 5.41.

4. Preparation of 1-ethoxy-2-[N-phenyl-N-(diethylamino-propyl)]-aminoindane (formula I: R$_1$ = R$_2$ = C$_2$H$_5$; A = OC$_2$H$_5$; n = 2; B = phenyl; Z = CH$_2$).

This compound is prepared by the method used in section 3 of Example 1, using 1-ethoxy-2-phenylaminoindane instead of 1-methoxy-2-phenylaminoindane. The duration of the reaction is 22 hours and the yield of 20%. The oxalate recrystallized from isopropanol melts at 133°–134°C.

analysis: % calculated: C 68.39; H7.95; N 6.14. % found: C 68.2; H 7.74; N 6.05.

EXAMPLE 3

Preparation of 1-methoxy-2-[N-phenyl-N-(dimethylaminopropyl)]-aminoindane (formula I: R$_1$ = R$_2$ = CH$_3$; n = 2; A = OCH$_3$; B = phenyl; Z = CH$_2$).

This compound is prepared by the method described in the Example 1, section 3, using γ-chloropropyldimethylamine instead of γ-chloropropyldiethylamine. The duration of the reaction is of 4 hours.

Yield: 80%.

15

The fumarate of the desired compound is recrystallized from acetone. Melting point: 149°–151°C.

Analysis: % calculated: C 68.16; H 7.32; N 6.36. % found: C 68.00; H 7.20; N 6.43.

EXAMPLE 4

Preparation of 1-methoxy-2-[N-phenyl-N-diethylaminoacetyl]-aminoindane (formula I: $R_1 = R_2 = C_2H_5$; $n = 1$; $A = OCH_3$ $B =$ phenyl; $Z = CO$).

1. Preparation of 1-methoxy-2-(N-phenyl-N-chloracetyl)-aminoindane (formula V: $n = 1$; $A = OCH_3$; $B =$ phenyl).

0.04 mol of 1-methoxy-2-phenylaminoindane and 0.06 mol of $ClCO-CH_2Cl$ are refluxed in benzene (50 ml) during 90 minutes. After cooling, the benzene is removed. The residue is washed with 20 ml of petroleum ether and recrystallized from petroleum ether. Melting point 104°–Ψ°C.

Yield: 95%.

Analysis: % calculated C 68.46; H 5.74; N 4.43; Cl 11.23. % found: C 69.11; H 5.59; N 4.65; Cl 11.47.

2. Preparation of 1-methoxy-2-[N-phenyl-N-diethylamino-acetyl]-aminoindane (formula VIII: $R_1 = R_2 = C_2H_5$; $n = 1$; $A = OCH_3$; $B =$ phenyl; formula I: $Z = CO$).

5.8 grams of 1-methoxy-2-(N-phenyl-N-chloracetyl)-aminoindane and 2.63 grams of diethylamine are dissolved in 50 ml of anhydrous ethanol. The solution is refluxed during 24 hours, but after 6 hours 1.32 grams of diethylamine are further added. When the reaction is finished, the alcohol is removed and the residue is treated with diluted hydrochloric acid. The obtained solution is made alkaline and extracted by means of chloroform. After removal of the chloroform, a residue of 6 grams is obtained. After recrystallization from acetone, the hydrochloride melts at 188°–190°C.

Analysis: % calculated: C 67.94; H 7.51; N 7.20; Cl 9.11. % found: C 68; H 7.48; N 6.98; Cl 9.28.

EXAMPLE 5

Preparation of 1-methoxy-2-[N-(diethylaminoethyl)]-aminoindane (formula I: $R_1 = R_2 = C_2H_5$; $n = 1$; $A = OCH_3$ $B =$ phenyl; $Z = CH_2$).

The compound prepared in Example 4, section 2, is reduced by means of aluminum lithium hydride by a known method. The hydrochloride of the desired compound melts at 145°–147°C. Another method for preparing the same compound is described in example 14.

EXAMPLE 6

Preparation of 1-methoxy-2-[N-phenyl-N-(diethylaminopropionyl)]-aminoindane (formula I: $R_1 = R_2 = C_2H_5$; $n = 2$; $A = OCH_3$; $B =$ phenyl; $Z = CO$).

1. Preparation of 1-methoxy-2-(N-phenyl-N-β-chloropropionyl)-aminoindane (formula V: $n = 2$; $A = OCH_3$; $B =$ phenyl).

This compound is prepared as described in Example 4, section 1, using the chloride of β-chloropropionic acid instead of the chloride of chloroacetic acid.

Yield: 90%.

The desired product melts at 117°–118°C after recrystallization from petroleum ether (60°–80°C).

Analysis: % calculated: C 69.19; H 6.11; N 4.25; Cl 10.75. % found: C 69.47; H 6.29; N 4.35; Cl 10.60.

2. Preparation of 1-methoxy-2-N-phenyl-N-diethylaminopropionyl)-aminoindane (formula VIII: $R_1 = R_2 = C_2H_5$; $n = 2$; $A = OCH_3$; $B =$ phenyl).

Starting from 1-methoxy-2-(N-phenyl-N-β-chloropropionyl)-aminoindane, this compound is prepared in the manner described in Example 4, section 2. Melting point: 146°–147°C ($C_6H_6$).

Analysis: % calculated: C 68.56; H 7.76; N 6.95; Cl 8.80. % found: C 68.54; H 7.74; N 6.84; Cl 8.63.

EXAMPLE 7

Preparation of 1-methoxy-2-(N-diethylaminopropyl)-aminoindane (formula I: $R_1 = R_2 = C_2H_5$; $n = 2$; $A = OCH_3$ $B =$ phenyl; $Z = CH_2$).

This compound is prepared by reduction of 1-methoxy-2-(N-phenyl-N-diethylaminopropionyl)-aminoindane by means of aluminum lithium hydride.

EXAMPLE 8

Preparation of 1-methoxy-2-(N-phenyl-N-piperidinoacetyl)-aminoindane (formula VIII:

$=$ piperidino; $n = 1$; $B =$ phenyl; $A = OCH_3$; formula I: $Z = CO$).

This compound is prepared in the manner described in Example 4, section 2, except that piperidine is used instead of diethylamine. The obtained free amine melts at 85°–86°C.

Yield: 75%. The hydrochloride of the amine recrystallized from acetone melts at 216°–218°C.

| Analysis of the hydrochloride : | C | H | N | Cl |
|---|---|---|---|---|
| % calculated : | 68.9 | 7.29 | 6.98 | 8.84 |
| % found : | 69.07 | 7.03 | 7.20 | 8.96 |

EXAMPLE 9

Preparation of
1-methoxy-2-[(N-phenyl-N-(piperidinoethyl)]-aminoindane (formula I:

= piperidino: n = 1; A = OCH$_3$; B=phenyl; Z = CH$_2$).

This compound is prepared from 1-methoxy-2-(N-phenyl-N-piperidinoacetyl)-aminoindane by reduction by means of aluminium lithium hydride. The fumarate recrystallized from ethyl acetate melts at 140°–142°C.

| Analysis : | C | H | N |
|---|---|---|---|
| % calculated : | 69.5 | 7.34 | 6 |
| % found : | 69.7 | 7.22 | 5.93 |

Another method for preparing the same compound is described in Example 15.

EXAMPLE 10

Preparation of
1-dimethylamino-2-[(N-phenyl-N-(γ-dimethylaminopropyl)]-aminoindane (formula I: R$_1$=R$_2$=C$_2$H$_5$; n = 2; A = dimethylamino: B = phenyl; Z = CH$_2$). 1.

Preparation of 1-diemthylamino-2-phenylaminoindane (formula II: A = dimethylamino; B = phenyl) 11.2 grams of 1-dimethylamino-2-chloroindane hydrochloride are stirred during 2 hours at room temperature in 40 ml of aniline. The reaction mixture is treated by means of 75 ml of chloroform and the aniline hydrochloride is separated by filtration. The filtrate is evaporated to dryness, so as to remove the excess of aniline. The residue is treated with 250 ml of water. After addition of charcoal, the solution is filtered and made alkaline. By cooling in a refrigerator, the desired amine is obtained (11.5 grams, yield: 95%). After recrystallization from petroleum ether (60°–80°C) the product melts at 90°–92°C.

| Analysis : | C | H | N |
|---|---|---|---|
| % calculated : | 80.91 | 7.93 | 11.1 |
| % found : | 81.40 | 7.91 | 11.25 |

| Analysis of the fumarate : | C | H | N |
|---|---|---|---|
| % calculated : | 68.46 | 6.56 | 7.6 |
| % found : | 68.84 | 6.61 | 7.57 |

2. Preparation of
1-dimethylamino-2-[(N-phenyl-N(γ-diethylaminopropyl)]-aminoindane (formula I: R$_1$=R$_2$=C$_2$H$_5$; n = 2; - A = dimethylamino; B = phenyl; Z = CH$_2$).

This compound is prepared from 1-dimethylamino-2-dimethylamino-2-phenylaminoindane in the manner described in example 1, section 3, except that the oxalate of the desired compound is prepared instead of the fumarate thereof.

Yield: 75%. After recrystallization from ethanol, the oxalate melts at 195°–197°C.

Analysis: ( for 1 equivalent of the free amine and 1.5 equivalents of oxalic acid; molecular weight: 500.63 - C$_{27}$H$_{38}$N$_3$O$_6$) % calculated: 64.77, 7.65, 8.39, % found: 64.66, 7.73, 8.05,

EXAMPLE 11

Preparation of
1-dimethylamino-2-[N-phenyl-N-(γ-dimethylaminopropyl)]-aminoindane (formula I = R$_1$=R$_2$=CH$_3$; n = 2; A = dimethylamino; B = phenyl; Z = CH$_2$).

This compound is prepared in the manner described in example 1, section 3, from 1-dimethylamino-2-phenyl-aminoindane by using γ-chloropropyldimethylamine as alkylating agent. The prepared oxalate (yield: 80%) melts at 193°–195°C. From the purified oxalate, the free amine is prepared and converted into difumarate which melts at 167°–169°C after recrystallization from acetone and methanol.

| Analysis : Molecular weight 569.66 (C$_{30}$H$_{39}$N$_3$O$_8$) | | | |
|---|---|---|---|
| | C | H | N |
| % calculated : | 63.25 | 6.9 | 7.37 |
| % found : | 63.21 | 7.19 | 7.38 |

EXAMPLE 12

Preparation of
1-diethylamino-2-[N-phenyl-N-(γ-diethylaminopropyl)]-aminoindane (formula I: R$_1$=R$_2$=C$_2$H$_5$; n = 2; A = diethylamino: B = phenyl; Z = CH$_2$).

1. Preparation of 1-diethylamino-2-phenylaminoindane (formula II: A = diethylamino, B = phenyl)

24.5 grams (0.094 mol.) of 1-diethylamino-2-chloroindane and 100 ml aniline are stirred during 1 hour at room temperature. After addition of 100 ml of chloroform, the aniline hydrochloride is separated by filtration and the filtrate is evaporated to dryness. The residue is extracted with 200 ml of water, made alkaline and extracted with ether. After drying on potassium carbonate and filtration, the solvents are removed and the product is distilled. The fraction distilling at 165°C/0.4 mm is collected. 20.6 grams (yield: 80%) of a product melting at 37°–39°C after recrystallization from petroleum ether (40°–60°C) are obtained.

| Analysis : | C | H | N |
|---|---|---|---|
| % calculated : | 81.38 | 8.62 | 9.99 |
| % found : | 81.38 | 8.80 | 10.12 |

2. Preparation of 1-diethylamino-2-[N-phenyl-N-(γ-diethylaminopropy)]-aminoindane (formula I: $R_1=R_2=C_2H_5$; n = 2; A = diethylamino; B = phenyl; Z = $CH_2$)

12.6 grams of 1-diethylamino-2-phenylaminoindane are dissolved in 150 ml of toluene, in the presence of 3.51 grams of $NaNH_2$ (0.09 mol). After refluxing during 20 minutes 0.076 mol of γ-chloropropyldiethylamine are added, the mixture being then further refluxed during 1 hour. After cooling and addition of 100 ml of water, the mixture is decanted and extracted by means of 100 ml of toluene. The toluene phase is extracted by means of 1 N hydrochloric acid. The acid extract is made alkaline and extracted with benzene. After drying of the benzene phase on potassium carbonate, the benzene is evaporated and the product distilled. The fraction distilling at 210°C/0.9 mm is collected. 14.8 grams (yield: 83%) of the desired product are obtained.

| Analysis : | C | H | N |
|---|---|---|---|
| % calculated : | 79.33 | 9.99 | 10.67 |
| % found : | 79.43 | 9.93 | 10.50 |

EXAMPLE 13

Preparation of 1-diethylamino-2-[N-phenyl-N-(β-dimethylaminoethyl)]-aminoindane (formula I: $R_1=R_2=CH_3$; n =1; A = diethyl amino; B = phenyl; Z = $CH_2$)

This compound is prepared by the method described is example 12, section 2, except that β-chloroethyldimethylamine is used instead of γ-chloropropyldiethylamine. Yield 80%. The dihydrochloride obtained after recrystallization from acetone and methanol melts at 209°–210°C.

| Analysis: | C | H | N | Cl |
|---|---|---|---|---|
| % calculated : | 65.08 | 8.31 | 9.89 | 16.7 |
| % found : | 64.9 | 8.27 | 9.78 | 16.4 |

EXAMPLE 14

Preparation of 1-methoxy-2-[N-phenyl-N-(diethylaminoethyl)]-aminoindane (formula I: $R_1=R_2 = C_2H_5$; n = 1; A = $OCH_3$; B = phenyl; Z = $CH_2$)

9.6 grams of 1-methoxy-2-phenylaminoindane, 2.4 grams of $NaNH_2$ and 100 ml of benzene are refluxed during 30 minutes. 7 grams of β-chloroethyldiethylamine are then added. The mixture is refluxed during 48 hours. After cooling, 100 ml of water are added to the reaction mixture which is then acidified. The aqueous phase is separated, made alkaline and extracted with chloroform. The chloroform phase is dried and the solvent is removed therefrom, the mixture being then distilled. The fraction distilling at 174°– 177°C/0.1 mm is collected (10.3 grams). The hydrochloride of the desired product is prepared in aqueous solution at a pH of 5.3. The aqueous solution is evaporated and dried with benzene (azeotropic distillation). 9.7 grams of the desired hydrochloride are obtained. After recrystallization from ethylacetate, this hydrochloride melts at 145°–147°C.

| Analysis : | C | H | N | Cl |
|---|---|---|---|---|
| % calculated : | 70.46 | 8.33 | 7.47 | 9.46 |
| % found : | 70.38 | 8.33 | 7.63 | 9.28 |

EXAMPLE 15

Preparation of 1-methoxy-2-[N-phenyl-N-(β-N'-piperidinoethyl)]-aminoindane (formula I:

= piperidino; n = 1; A=OCH 3; B = phenyl; Z = $CH_2$)

This compound is prepared in the manner described in example 14, except that β-chloroethylpiperidine is used instead of β-chloroethyldiethylamine.

Yield 50%.

The fumarate of the desired product melts at 140°–142°C after recrystallization from ethylacetate.

| Analysis : | C | H | N |
|---|---|---|---|
| % calculated : | 69.50 | 7.34 | 6.00 |
| % found : | 69.70 | 7.22 | 5.93 |

EXAMPLE 16

Preparation of 1-ethoxy-2-(N-phenyl-N-diethylaminoacetyl)-aminoindane (formula I: $R_1=R_2 = C_2H_5$; n=1; A = $OC_2H_5$; B=phenyl; Z = CO)

1. Preparation of 1-ethoxy-2-(N-phenyl-N-chloracetyl)-aminoindane (formula V: n =1; A=$OC_2H_5$; B=phenyl).

2.53 grams of 1-ethoxy-2-phenylaminoindane, 2.5 ml of the chloride of chloracetic acid and 15 ml of benzene are refluxed during 30 minutes. The mixture is evaporated to dryness and the residue is extracted with petroleum ether. Yield 91%. The desired product melts at 142°– 143°C after recrystallization from benxene and cyclohexane.

| Analysis : | C | H | N | Cl |
|---|---|---|---|---|
| % calculated : | 69.19 | 6.11 | 4.25 | 10.75 |
| % found : | 69.19 | 5.90 | 4.07 | 11.1 |

2. Preparation of 1-ethoxy-2-[N-phenyl-N-(diethylaminoacetyl)]-aminoindane (formula VIII: A = $C_2H_5O-$; B = phenyl; $n = 1$, $R_1 = R_2 = C_2H_5$)

(formula I: Z = CO)

This compound is prepared by the method described in Example 4, section 2.

Melting point: 195°– 196°C after recrystallization from acetone

| Analysis : | C | H | N | Cl |
|---|---|---|---|---|
| % calculated | 68.55 | 7.75 | 6.95 | 8.8 |
| % found | 68.12 | 7.83 | 6.8 | 8.5 |

EXAMPLE 17

Preparation of 1-ethoxy-2-[N-phenyl-N-diethylaminoethyl)]-aminoindane (formula I: $R_1 = R_2 = C_2H_5$; $n = 1$; A=$OC_2H_5$; B = phenyl; Z =$CH_2$)

This compound is obtained by reduction of the preceding compound of Example 16 by means of AlLiH$_4$ in ether m.p. 137° – 138°C (in ethylacetate).

| Analysis : | C | H | N | Cl |
|---|---|---|---|---|
| % calculated : | 71.02 | 8.55 | 7.20 | 9.12 |
| % found : | 70.99 | 8.31 | 7.27 | 9.21 |

EXAMPLE 18

Preparation of 1-ethoxy-2-[N-phenyl-N-(β-diethylaminopropionyl)]-aminoindane (formula I : $R_1=R_2=C_2H_5$; $n = 2$; A = $OC_2H_5$; B = phenyl; Z = CO)

1. Preparation of 1-ethoxy-2-[N-phenyl-N-(β-chloropropionyl)]-aminoindane (formula V : $n = 2$; A = $OC_2H_5$; B = phenyl)

2.53 grams of 1-ethoxy-2-phenylaminoindane, 2.5 ml of the chloride of β-chloropropionic acid and 15 ml of benzene are refluxed during 30 minutes. The mixture is then evaporated to dryness and the residue is extracted with petroleum ether (40° – 60°C). 2.84 grams (yield 85%) of the desired product are obtained. After recrystallization from petroleum ether (40° – 60°C), this product melts at 92° – 93°C.

| Analysis : | C | H | N | Cl |
|---|---|---|---|---|
| % calculated : | 69.86 | 6.45 | 4.07 | 10.31 |
| % found : | 69.89 | 6.01 | 3.9 | 10.2 |

2. Preparation of 1-ethoxy-2[N-phenyl-N-(β-diethylaminopropionyl)]-aminoindane (formula VIII : A = $C_2H_5O$; B = phenyl; $R_1 = R_2 = $ ethyl; $n = 2$)

(formula I : Z = CO)

1-ethoxy-2-[N-phenyl-N-(β-chloropropionyl)-]aminoindane is reacted during 24 hours with diethylamine at 100°C in an autoclave m.p. : 105°–110°C (oxalate recrystallized from acetone)

| Analysis : | C | H | N |
|---|---|---|---|
| % calculated : | 66.36 | 7.28 | 5.95 |
| % found : | 66.01 | 7.29 | 6.20 |

EXAMPLE 19

Preparation of 1-ethoxy-2-[N-phenyl-N-(diethylaminopropyl)]-aminoindane (formula I : $R_1 = R_2 = C_2H_5$; $n = 2$; A = $OC_2H_5$; B = phenyl; Z = $CH_2$)

This product is prepared from 1-ethoxy-2-(N-phenyl-N-β-chloropropionyl)-aminoindane by reduction thereof by means of aluminium lithium hydride, so as to obtain 1-ethoxy-2-[N-phenyl-N-chloropropyl)]-aminoindane (formula VI : $n = 2$; A = $OC_2H_5$; B = phenyl), the latter compound being treated with diethylamine.

The oxalate of the desired compound recrystallized from isopropanol melts at 133°–134°C.

| Analysis : | C | H | N |
|---|---|---|---|
| % calculated | 68.39 | 7.95 | 6.14 |
| % found | 68.2 | 7.74 | 6.05 |

EXAMPLE 20

Preparation of 1-methoxy-2-[N-phenyl-N-(piperidinopropionyl)]-aminoindane hydrochloride (formula I : B = phenyl;

= piperidino; $n = 2$; A = $OCH_3$; Z = CO)

10 g of 1-methoxy-2-[N-phenyl-N-(β-chloropropionyl)]-aminoindane prepared as described in example 6, section (1), are dissolved in a solution of piperidine in ethanol. The reaction mixture is refluxed during 24 hours. After removal of the alcohol, the residue is treated with diluted hydrochloric acid. The obtained solution is made alkaline and extracted by means of chloroform. The residue of the chloroform extract is dissolved in diluted hydrochloric acid and carefully dried under vacuum. The residue is treated with acetone and the obtained solution is filtered. By recrystallization from a mixture of acetone and methanol the desired hydrochoride is obtained.

| Analysis of the base : | C | H | N |
|---|---|---|---|
| % calculated : | 76.15 | 7.98 | 7.40 |
| % found : | 75.96 | 7.94 | 7.54 |

| Analysis of the hydrochloride | Cl |
|---|---|
| % calculated : | 8.54 |
| % found : | 8.60 |

EXAMPLE 21

Preparation of
1-methoxy-2-[N-phenyl-N-(piperidinopropyl)]-aminoindane hydrochloride.

(formula I : A = OCH$_3$; B = phenyl;

= piperidino; $n = 2$; Z = CH$_2$)

To a solution of 1-methoxy-2-(N-phenyl-N-piperidinopropionyl)-aminoindane in ether, a suspension of 2 g of lithium aluminum hydride in 100 ml of ether is continuously added. The obtained mixture is refluxed during 2 hours. After cooling with ice water, ice and water are added to the mixture, which is then decanted and dried.

The obtained oil is treated with diluted hydrochloric acid and the pH is then brought to 6. After extraction with chloroform, the organic phase is dried and distilled under vacuum. The residue is treated with 100 ml of acetone and heated until a precipitate is obtained.

By recrystallization from a mixture of methanol and acetone, the desired product melting at 173°–174°C is obtained.

| Analysis : | C | H | N | Cl |
|---|---|---|---|---|
| % calculated : | 71.88 | 8.29 | 6.98 | 8.84 |
| % found : | 72.04 | 8.20 | 7.01 | 8.64 |

EXAMPLE 22

Preparation of
1-methoxy-2-[N-phenyl-N-β-(4'-methylpiperazino)propionyl)]-aminoindane (formula I : A = methoxy; B = phenyl; $n = 2$;

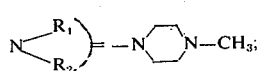

Z = CO)

This compound is prepared as in Example 20, using N-methyl-piperazine instead of piperidine. m.p. of the free base : 100° – 101°C

| Analysis : | C | H | N |
|---|---|---|---|
| % calculated : | 73.25 | 7.93 | 10.67 |
| % found : | 73.11 | 7.91 | 10.47 |

EXAMPLE 23

Preparation of
1-methoxy-2-[N-phenyl-N-(γ-methylpiperazinopropyl)]-aminoindane trihydrochloride (formula I : B = phenyl;

= methylpiperazino; $n = 2$; A = O.CH$_3$; Z = CH$_2$)

This compound is prepared as described in example 21. The obtained product melts at 230°–232°C.

| Analysis : | C | H | N | Cl |
|---|---|---|---|---|
| % calculated | 58.95 | 7.42 | 8.59 | 21.75 |
| % found : | 58.92 | 7.50 | 8.98 | 21.40 |

EXAMPLE 24

Preparation of
1-ethoxy-2-[N-phenyl-N-(β-pyrrolidinopropionyl)]-aminoindane hydrochloride (formula I : A = ethoxy;

= pyrrolidino; $n = 2$, B = phenyl; Z = CO)

This compound is prepared from the acylated derivative described in Example 18 Section (1) following the procedure described in Example 18 Section (2), the amine being here pyrrolidine.

175° – 177°C (isopropanol)

| Analysis : | C | H | N | Cl |
|---|---|---|---|---|
| % calculated | 69.46 | 7.53 | 6.75 | 8.55 |
| % found | 69.52 | 7.51 | 6.51 | 8.35 |

EXAMPLE 25

Preparation of
1-ethoxy-2[N-phenyl-N-(pyrrolidinopropyl)]-aminoindane hydrochloride (formula I : A = ethoxy,

= pyrrolidino, B = phenyl, $n = 2$, $Z = CH_2$)

The preceding compound described in Example 24 is reduced by means of AlLiH$_4$ following the procedure described in Ex. 19.

m.p.: 189°–190°C (methanol - acetone)

| Analysis : | C | H | N | Cl |
|---|---|---|---|---|
| % calculated | 71.88 | 8.29 | 6.99 | 8.84 |
| % found | 71.46 | 8.28 | 6.86 | 8.98 |

EXAMPLE 26

Preparation of
1-methoxy-2-[N-phenyl-N-(β-methylaminopropionyl)]-aminoindane hydrochloride (formula I : A = methoxy; $R_1$ = H; $R_2$ = $CH_3$; B = phenyl; $n = 2$; Z = CO)

10 g of 1-methoxy-2-(N-phenyl-N-β-chloropropionyl-aminoindane are dissolved in 70 ml of a 33% solution of methylamine in ethanol. The mixture is refluxed during 24 hours. The ethanol is then removed and the mixture is treated with diluted hydrochloric acid. The obtained solution is made alkaline and extracted with chloroform. The residue of the chloroform solution is dissolved in diluted hydrochloric acid. After removal of water under reduced pressure, the residue is treated with acetone and filtered. The product is recrystallized from a mixture of methanol and acetone.

m.p.: 210°–215°C.

| Analysis : | C | H | N | Cl |
|---|---|---|---|---|
| Calculated % | 66.55 | 6.98 | 7.76 | 9.82 |
| Found % | 66.65 | 6.93 | 7.87 | 10.00 |

EXAMPLE 27

Preparation of
1-methoxy-2-[N-phenyl-N-(methylaminopropyl)]-aminoindane (formula I : A = methoxy; $R_1$ = H; $R_2$ = $CH_3$; $n = 2$; Z = $CH_2$; B = phenyl)

To a solution of 1-methoxy-2-[N-phenyl-N-(β-methylaminopropionyl)]-aminoindane in 80 ml of anhydrous ether, a suspension of 2 g of lithium aluminium hydride in 100 ml of ether is added. The obtained mixture is refluxed during 2 hours and then cooled with ice water. After decantation and drying, the obtained oil is treated with diluted hydrochloric acid. The pH of the solution is brought to 6 and the solution is extracted by means of chloroform. The organic phase is dried and distilled under reduced pressure. The mixture is treated with 100 ml of acetone and heated until a precipitate is obtained.

The desired hydrochloride is recrystallized from a mixture of methanol and acetone.

m.p.: 139°–140°C.

| Analysis : | C | H | N | Cl |
|---|---|---|---|---|
| Calculated % | 69.24 | 7.84 | 8.04 | 10.22 |
| Found % | 69.50 | 7.74 | 8.05 | 10.20 |

EXAMPLE 28 preparation of
1-methoxy-2N-phenyl-N-(β-ethylaminopropionyl)]-aminoindane hydrochloride (formula I : A = methoxy; $R_1$ = H; $R_2$ = $C_2H_5$; B = phenyl; $n = 2$; Z = CO)

This compound is prepared as in Example 26 using a solution of ethylamine in ethanol.

m.p.: 167°–168°C. (isopropanol)

| Analysis : | C | H | N | Cl. |
|---|---|---|---|---|
| % calculated | 67.27 | 7.26 | 7.47 | 9.46 |
| % found | 67.10 | 7.12 | 7.70 | 9.43 |

EXAMPLE 29

Preparation of the
1-methoxy-2[N-phenyl-N-(γ-ethylaminopropyl)]-aminoindane hydrochloride (formula I : A = methoxy; $R_1$ = H; $R_2$ = $C_2H_5$; B = phenyl, $n = 2$, Z = $CH_2$)

This compound is prepared by reduction of the compound of the preceding Example, applying the method of Example 27.

m.p.: 151°–152°C (methanol - acetone)

| Analysis : | C | H | N | Cl. |
|---|---|---|---|---|
| % calculated | 69.87 | 8.09 | 7.76 | 9.82 |
| % found | 70.01 | 7.90 | 7.70 | 9.60 |

EXAMPLE 30

Preparation of the
1-ethoxy-2[N-phenyl-N-(β-ethylaminopropionyl)]-aminoindane hydrochloride (formula I : A = ethoxy; $R_1$ = H; $R_2$ = $C_2H_5$; B = phenyl; $n = 2$; Z = CO)

This substance is prepared from the acetylated compound described in the example 18, section 1), the amine being : $C_2H_5$ $NH_2$ and following the procedure described in the same example, section 2.

m.p.: 184°–186°C [fumarate (amine + ½ molecule of fumaric acid recrystallized from ethanol]

| Analysis : | C | H | N |
|---|---|---|---|
| % calculated | 70.22 | 7.37 | 6.82 |
| % found | 69.95 | 7.20 | 6.88 |

EXAMPLE 31

Preparation of 1-ethoxy-2[N-phenyl-N-(γ-ethylaminopropyl)]-aminoindane hydrochloride (formula I : A = ethoxy; $R_1$ = H; $R_2$ = $C_2H_5$; n = 2; B = phenyl)

This substance is obtained by reduction of the preceding compound (Ex. 30) with $AlLiH_4$.

m.p.: 124°–126°C (methanol - acetone)

| Analysis : | C | H | N | Cl |
|---|---|---|---|---|
| % calculated | 70.47 | 8.33 | 7.47 | 9.46 |
| % found | 70.18 | 8.22 | 7.56 | 9.42 |

EXAMPLE 32

Preparation of the 1-ethoxy-2-[N-phenyl-N-(ethylaminoacetyl)]-aminoindane fumarate (formula I : = ethoxy; $R_1$ = H; $R_2$ = $C_2H_5$; B = phenyl; n = 1; Z = CO)

This compound is obtained from the acylated compound described in Example 17, section 1) with $C_2H_5NH_2$ as amine.

m.p.: 181°–182°C (methanol - acetone)

| Analysis : | C | H | N |
|---|---|---|---|
| % calculated | 66.06 | 6.65 | 6.16 |
| % found | 66.14 | 6.65 | 6.12 |

EXAMPLE 33

Preparation of the 1-ethoxy-2[N-phenyl-N(β-ethylaminoethyl)]-aminoindane hydrochloride (formula I : A = ethoxy; $R_1$ = H; $R_2$ = $C_2H_5$; n = 1; Z = $CH_2$; B = phenyl)

This compound is obtained by reduction of the compound of example 32 with $AlLiH_4$.

m.p.: 178°–179°C (ethanol)

| Analysis : | C | H | N | Cl |
|---|---|---|---|---|
| % calculated | 69.88 | 8.10 | 7.76 | 9.82 |
| % found | 69.73 | 7.99 | 7.68 | 9.81 |

EXAMPLE 34

Preparation of the 1-methoxy-2[N-phenyl-N(γ-methylethylaminopropyl)]-aminoindane hydrochloride (formula I : A = methoxy; $R_1$ = $CH_3$; $R_2$ = $C_2H_5$; n = 2; Z = $CH_2$; B = phenyl)

This substance is obtained from the acylated compound described in example 6 section 1 by reacting said compound with methylethylamine as amine, and reducing the thus obtained compound of formula VIII by means of $AlLiH_4$ in ether.

m.p.: 175°–176°C (acetone)

| Analysis : | C | H | N | Cl |
|---|---|---|---|---|
| % calculated | 70.46 | 8.33 | 7.47 | 9.46 |
| % found | 70.20 | 8.33 | 7.50 | 9.48 |

EXAMPLE 35

Preparation of the 1-methoxy-2-[N-phenyl-N-(β-morpholinopropionyl)]-aminoindane hydrochloride (formula I : A = methoxy; B = phenyl; n = 2;

morpholino; Z = CO)

This compound is prepared by the method of Example 20 except that morpholine is used instead of piperidine.

m.p.: 184°–185°C. (isopropanol)

| Analysis : | C | H | N | Cl |
|---|---|---|---|---|
| % Calculated | 66.25 | 7.01 | 6.72 | 8.50 |
| % Found | 66.10 | 7.15 | 6.88 | 8.30 |

EXAMPLE 36

Preparation of the 1-methoxy-2-[N-phenyl-N-(β-pyrrolidinopropionyl)]-aminoindane hydrochloride (formula I : A = methoxy; B = phenyl; n = 2;

= pyrrolidino; Z = CO)

This compound is prepared by the method of Example 20 except that pyrrolidine is used instead of piperidine.

m.p.: 180°–181°C. (isopropanol)

| Analysis : | C | H | N | Cl |
|---|---|---|---|---|
| % Calculated | 68.90 | 7.29 | 6.99 | 8.84 |
| % Found | 68.70 | 7.25 | 6.84 | 8.76 |

EXAMPLE 37

Preparation of the 1-ethoxy-2-[N-phenyl-N-(β-piperidinopropionyl)]-aminoidane hydrochloride (formula I : A = ethoxy;

= piperidino, $n = 2$, B = phenyl; Z = CO).

This substance is prepared from the acylated derivative described in Example 18, section 1 following the procedure described in Example 18 section 2, except that piperidine is used instead of diethylamine.

m.p.: 185°–187°C (methanol - ethylacetate)

| Analysis : | C | H | N | Cl |
|---|---|---|---|---|
| % Calculated: | 69.99 | 7.75 | 6.53 | 8.27 |
| % Found | 69.40 | 7.84 | 6.96 | 8.30 |

EXAMPLE 38

Preparation of the 1-methoxy-2-[N-phenyl-N-(γ-piperidinobutyroyl)]-aminoindane hydrochloride (formula I : A = methoxy; B = phenyl; $n = 3$;

= piperidino; Z = CO)

A. Preparation of 1-methoxy-2-[N-phenyl-N-γ-chlorobutyroyl]-aminoindane (formula V; $n = 3$; A = OCH$_3$; B = phenyl)

This compound is prepared as described in example 4 section 1, using the chloride of 4-chlorobutyric acid instead of the chloride of chloroacetic acid.

The desired product melts at 68°–70°C after recrystallisation from petroleum ether (60°–80°).

| Analysis : | C | H | N | Cl |
|---|---|---|---|---|
| % Calculated | 69.85 | 6.44 | 4.07 | 10.31 |
| % Found | 69.70 | 6.43 | 4.10 | 10.32 |

B. Preparation of the desired end product.

This compound is prepared from the acylated derivative described in part A of this example following the procedure described in example 20.

m.p.: 157°–159°C. (benzene)

| Analysis : | C | H | N | Cl |
|---|---|---|---|---|
| % Calculated | 69.99 | 7.75 | 6.53 | 8.27 |
| % Found | 69.47 | 7.69 | 6.62 | 8.38 |

EXAMPLE 39

Preparation of 1-diethylamino-2-[N-phenyl-N-(β-piperidinopropionyl)]-aminoindane oxalate (formula I :

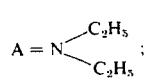

B = phenyl;

= piperidino; $n = 2$; Z = CO)

1-diethylamino-2-phenylaminoindane (Example 12 section 1) is acylated by means of Cl-CO(CH$_2$)$_2$ Cl as described in example 6, section 1. The product thus obtained is thus reacted with piperidine applying the method of Example 20.

m.p.: 192°–193°C. (ethanol)

| Analysis : | C | H | N |
|---|---|---|---|
| % Calculated | 68.34 | 7.71 | 8.24 |
| % Found | 68.15 | 7.66 | 8.12 |

The following examples 40–43 illustrate pharmaceutical compositions of this invention for the treatment of heart arrhythmya.

EXAMPLE 40

| CAPSULE | |
|---|---|
| Active ingredient of formula I | 100 mg |
| Lactose | 120 mg |
| Rice starch | 30 mg |
| Corn starch | 30 mg |
| Colloidal silica | 1 mg |
| for one capsule | |

EXAMPLE 41

| TABLET | |
|---|---|
| Active ingredient of formula I | 200 mg |
| Potato starch | 120 mg |
| Lactose | 80 mg |
| Starch sodium glycollate | 30 mg |
| Colloidal silica | 15 mg |
| Magnesium stearate | 5 mg |
| Hydroxy propylcellulose | 4 mg |
| Stearic acid | 2 mg |
| for one tablet | |

EXAMPLE 42

| PILLS. | |
|---|---|
| Core : | |
| Active ingredient of formula I | 50.0 mg |
| Lactose | 67.5 mg |
| Microcrystalline cellulose | 32.0 mg |
| Starch sodium glycollate | 8.2 mg |
| Colloidal silica | 0.4 mg |
| Magnesium stearate | 0.9 mg |
| Coating : | |
| Shellac | 1.0 mg |
| Sandarac | 0.2 mg |
| Castor oil | 0.3 mg |
| Gum arabic | 7.0 mg |
| Talc | 11.2 mg |
| Corn starch | 1.0 mg |
| Titanium oxide | 1.3 mg |
| Dyestuff | 4.0 mg |
| Sucrose | 142.8 mg |
| White wax / carnauba wax | 0.2 mg |
| for one pill | |

EXAMPLE 43

| Solution for perfusion. | |
| --- | --- |
| Active ingredient of formula I | 200 mg |
| Anhydrous sodium sulfite | 60 mg |
| Anhydrous sodium metabisulfite | 140 mg |
| Sodium chloride | 1.7 mg |
| Water for injection ad | 200 ml |

It should be understood that the invention is not exclusively limited to the embodiments described hereinabove and that many modifications may be brought thereto by the man skilled in the art without departing from the spirit and scope of the invention as defined in the appended claims.

What we claim is:

1. A new 2-aminoindane derivative of the formula

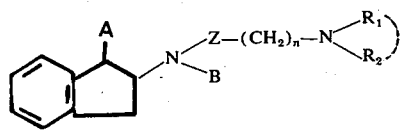

in which $n$ is equal to 1, 2, or 3, Z represents a $CH_2$ or CO group, $R_1$ and $R_2$ represent each a lower alkyl or hydroxyalkyl group containing 1 to 3 carbon atoms, and $R_1$ may also represent hydrogen, $R_1$ and $R_2$ also may form with the attached nitrogen atom a nitrogenous heterocyclic ring selected from the group consisting of piperidino, pyrrolidino, morpholino and methylpiperazino, B represents an unsubstituted phenyl group, A represents a methoxy or ethoxy group or a group of the formula

wherein $R_3$ and $R_4$ each represent a methyl or ethyl group or may form with the attached nitrogen atom a nitrogeneous heterocyclic ring selected from the group consisting of piperidino, pyrrolidino, morpholino and methylpiperazino, as well as the pharmaceutically acceptable acid addition salts of said compounds of formula I.

2. A new 2-aminoindane derivative of 2-aminoindane according to claim 1, in which Z represents a $CH_2$ group and $n$, $R_1$, $R_2$, A and B have the above meanings.

3. A new 2-aminoindane derivative of 2-aminoindane according to claim 1, in which Z represents a CO group and $n$, $R_1$, $R_2$, A and B have the above meanings.

4. A new 2-aminoindane derivative of 2-aminoindane according to claim 2, in which $n$ is equal to 1 and 2, $R_1$ and $R_2$ each represent a methyl or ethyl group, with the proviso that $R_1$ and $R_2$ may be different and $R_1$ may also represent a hydrogen atom, $R_1$ and $R_2$ may also form with the attached nitrogen atom a piperidino or pyrrolidino group, B represents an unsubstituted phenyl group and A represents a methoxy or ethoxy group, and the pharmaceutically acceptable acid addition salts thereof.

5. A new 2-aminoindane derivative according to claim 4 selected from 1-methoxy-2[N-phenyl-N-($\gamma$-methylethylaminopropyl)]aminoindane and the pharmaceutically acceptable acid addition salts thereof.

6. A new 2-aminoindane derivative according to claim 4 selected from 1-methoxy-2[N-phenyl-N-(piperidinopropyl)]aminoindane and the pharmaceutically acceptable acid addition salts thereof.

7. A new 2-aminoindane derivative according to claim 3, in which $n$ is equal to 1, 2 or 3, $R_1$ and $R_2$ each represent an ethyl group with the proviso that $R_1$ may also represent a hydrogen atom, $R_1$ and $R_2$ may also form with the attached nitrogen atom a piperidino group, B represents an unsubstituted phenyl group and A represents a methoxy or ethoxy group, and the pharmaceutically acceptable acid addition salts thereof.

8. A new 2-aminoindane derivative according to claim 7 selected from 1-methoxy-2-[N-phenyl-N-(piperidinopropionyl)]-aminoidane and the pharmaceutically acceptable acid addition salts thereof.

9. A new 2-aminoindane derivative according to claim 7 selected from 1-methoxy-2-[N-phenyl-N-(diethylaminopropionyl)]aminoindane, 1-methoxy-2-[N-phenyl-N-(diethylaminoacetyl)]aminoindane and the pharmaceutically acceptable acid addition salts of said compounds.

10. A 2-aminoindane derivative, according to claim 7, selected from 1-ethoxy-2-[N-phenyl-N-(ethyl aminoacetyl)]-aminoindane and the pharmaceutically acceptable acid addition salts thereof.

11. A 2-aminoindane derivative according to claim 7, selected from 1-ethoxy-2-[N-phenyl-N-(diethylaminoacetyl)]-aminoindane and the pharmaceutically acceptable acid addition salts thereof.

12. A 2-aminoindane derivative according to claim 7, selected from 1-ethoxy-2-[N-phenyl-N-($\beta$-ethylaminopropionyl)]-aminoindane and the pharmaceutically acceptable acid addition salts thereof.

13. A 2-aminoindane derivative according to claim 7, selected from 1-ethoxy-2-[N-phenyl-N-($\beta$-diethylamine propionyl)]aminoindane and the pharmaceutically acceptable acid addition salts thereof.

* * * * *